US012675078B2

(12) United States Patent
Casagrande et al.

(10) Patent No.: US 12,675,078 B2
(45) Date of Patent: Jul. 7, 2026

(54) TRANSDUCER DEVICE FOR A WEARABLE OBJECT, AND METHOD FOR OPERATING SAME

(71) Applicant: The Swatch Group Research and Development Ltd, Marin (CH)

(72) Inventors: Arnaud Casagrande, Bole (CH); Jean-Pierre Mignot, Pontarlier (FR)

(73) Assignee: The Swatch Group Research and Development Ltd, Marin (CH)

( * ) Notice: Subject to any disclaimer, the term of this patent is extended or adjusted under 35 U.S.C. 154(b) by 135 days.

(21) Appl. No.: 18/415,786

(22) Filed: Jan. 18, 2024

(65) Prior Publication Data

US 2024/0329604 A1 Oct. 3, 2024

(30) Foreign Application Priority Data

Mar. 29, 2023 (EP) .................................... 23164969

(51) Int. Cl.
*G04G 21/00* (2010.01)
*G04G 13/02* (2006.01)
*G08B 21/08* (2006.01)

(52) U.S. Cl.
CPC ........... *G04G 21/00* (2013.01); *G04G 13/021* (2013.01); *G08B 21/088* (2013.01)

(58) Field of Classification Search
CPC .... G04G 21/00; G04G 13/021; G08B 21/088; G08B 21/0227; G08B 21/0258;
(Continued)

(56) References Cited

U.S. PATENT DOCUMENTS 4,813,025 A * 3/1989 Rowland .............. G08B 21/088 441/89
5,463,598 A * 10/1995 Holland ................ B63C 9/0005 367/118
(Continued)

FOREIGN PATENT DOCUMENTS

CN 113691908 A 11/2021
CN 118719515 A * 10/2024 ........... G08B 3/1008
(Continued)

OTHER PUBLICATIONS

Japanese Office Action issued Mar. 11, 2025, in corresponding Japanese Patent Application No. 2024-004958, 4 pages.
(Continued)

*Primary Examiner* — Daniel Pihulic
(74) *Attorney, Agent, or Firm* — Oblon, McClelland, Maier & Neustadt, L.L.P.

(57) ABSTRACT

A transducer device of a wearable object or as a wearable object as such, includes means for generating a first action in a first operating mode related to a specific function of the wearable object under the control of a processor or micro-controller processing unit of an electronic circuit being powered by a DC voltage source. The means for generating is configured to generate a second communication action in a second operating mode different from the first operating mode so as to obtain a dual-mode transducer device. The second operating mode allows information or data communication signals to be communicated mainly to the outside of the transducer device so that it can be detected by a monitoring unit of a monitoring system, is able to establish communication, and can receive data or parameter signals from another transducer device. The communication signals are ultrasonic signals transmitted into a water body.

13 Claims, 1 Drawing Sheet

(58) Field of Classification Search
CPC ...... G08B 3/1008; H04B 11/00; H04B 13/02; G04B 47/06; B06B 1/06; B06B 3/00
See application file for complete search history.

(56) References Cited

U.S. PATENT DOCUMENTS

| | | | | | |
|---|---|---|---|---|---|
| 6,161,005 | A * | 12/2000 | Pinzon | G08C 17/02 | 455/352 |
| 6,222,484 | B1 * | 4/2001 | Seiple | H01Q 1/22 | 342/357.55 |
| 10,820,587 | B2 * | 11/2020 | Stoll | A01M 29/28 | |
| 2008/0218332 | A1 * | 9/2008 | Lyons | G08B 21/088 | 340/529 |
| 2009/0295566 | A1 | 12/2009 | Weintraub | | |
| 2024/0329604 | A1 * | 10/2024 | Casagrande | G04G 21/00 | |

FOREIGN PATENT DOCUMENTS

| | | | | |
|---|---|---|---|---|
| EP | 4439513 | A1 * | 10/2024 | G08B 3/1008 |
| FR | 2994854 | A1 * | 3/2014 | B63C 9/0005 |
| JP | 11-74848 | A | 3/1999 | |
| JP | 2000-278223 | A | 10/2000 | |
| JP | 2010-178255 | A | 8/2010 | |
| JP | 2019-20780 | A | 2/2019 | |
| JP | 2024156217 | A * | 11/2024 | G08B 3/1008 |
| JP | 7703057 | B2 * | 7/2025 | G04G 13/021 |

OTHER PUBLICATIONS

European Search Report issued Aug. 24, 2023 in European Application 23164969.0 filed on Mar. 29, 2023, 3 pages (with English Translation of Categories of Cited Documents).

* cited by examiner

TRANSDUCER DEVICE FOR A WEARABLE OBJECT, AND METHOD FOR OPERATING SAME

CROSS-REFERENCE TO RELATED APPLICATIONS

This application claims the benefit of priority from European Application No. 23164969.0 filed Mar. 29, 2023, the entire contents of which are incorporated herein by reference.

Technical Field of the Invention

The invention relates to a transducer device for a wearable object, such as a watch, capable of dual-mode operation.

The invention also relates to a method for operating the transducer device.

The invention also relates to a system for monitoring living beings, such as people or animals, in a defined location, mainly in an outdoor or indoor pool, by means of dual-mode transducer devices, each placed in a wearable object, such as a watch, worn by each living being to be monitored.

Living beings may be mainly swimmers or divers who need to be supervised when they are in the water of a swimming pool, lake, sea, river or ocean.

Technological Background

It is known to wear an electromechanical or electronic watch fitted with an audible signalling device, such as an alarm, to signal a selected time by means of at least one sound. The alarm can be produced using a buzzer, for example of the piezoelectric type. However, such an audible signalling device is only provided for a particular operating mode, which in this case is a watch alarm.

Patent FR 3 029 816 describes a tubular ultrasonic transducer for propagating acoustic waves in a fluid medium. It comprises an electromechanical conversion device with active elements associated with at least one metal tube for transmitting vibrations to the fluid medium, a system for transmitting vibrations between the conversion device and the tube and a device for pre-stressing the active elements of the conversion device. Such a transducer is capable of creating radial vibrations and propagating waves in fluid media. It can be used for cleaning applications, for example.

Patent application US 2003/0222782 A1 describes an alarm system for a swimming pool which comprises a mechanism for detecting an intrusion into the pool and generating a first alarm. A timer circuit is triggered by the first alarm to generate a predetermined elapsed time-out output signal. The time-out output signal allows to trigger a second alarm. The system further comprises a shutdown mechanism to silence the first alarm and the second alarm. The first alarm is a local alarm intended to be heard by people in the vicinity of the pool and the second alarm is a general alarm intended to be heard by people outside. The system does not comprise a device forming part of a watch with an alarm generator capable of operating in two different modes.

Patent application CN 105901845 describes a wristband device capable of generating an alarm in water. The device comprises a wristband with a housing, an alarm module integrated into the housing and a balloon. Two cavities are disposed in the alarm module, one cavity of which is gas-generating; a gas outlet hole is formed in the gas-generating cavity, part of a rubber stopper and part of the balloon are placed in the gas outlet, and the rubber stopper is disposed on the wristband. Nothing is provided with respect to a possible use in the alarm generating element which may be used for a function other than the generation of the alarm for the generation or reception of a communication signal.

SUMMARY OF THE INVENTION

The present invention relates to a transducer device of a wearable object, which comprises means for generating a first action in a first operating mode and for generating a second communication action in a second operating mode. The first action generated is mainly related to a function of the wearable object itself, while the second communication action is mainly for communicating with a monitoring unit of a monitoring system.

For this purpose, provision is made of a transducer device intended to be disposed in a wearable object or being a wearable object as such, which comprises the features of the claims.

Particular forms of the transducer device are also defined in the claims.

The means for generating a first action or a second action in two different modes is preferably a generator for signalling an alarm at a defined time in a first operating mode, and capable of transmitting or receiving data signals in a second operating mode. It may also be a device for signalling the sound of a watch, such as a buzzer of the piezoelectric type, for example. Preferably, the first operating mode is in a first frequency band of 0 to 20 kHz, while the second operating mode is in a second frequency band different from the first frequency band. The second frequency band may be above 20 KHz. Under these conditions, the transducer device is dual-mode, which reduces the number of components required to perform different functions.

As indicated above, the transducer device is dual-mode, to be able to serve for example as an alarm signal generator, or as an audible signalling device, when it is part of a wearable object, such as a watch, and in addition to be able to be used for the transmission and reception of signals at short distances or at long distances, when it is in the wearable object on or in a water body such as in a swimming pool, a river, a lake, a sea or an ocean. Under these conditions, in this second operating mode, the transducer device must form part of the wearable object or be the wearable object as such, and be capable of being manually or automatically selected or switched into the second operating mode for the transmission or reception of data signals in communication with at least one monitoring unit of a monitoring system.

Each monitoring unit of the monitoring system may be a beacon or beacon buoy or a boat on a water body for monitoring any activity, in particular of nearby people, provided with a transducer device as a wearable object or disposed in the wearable object. Each monitoring unit is able to receive information or data signals from a transducer device generally mounted in a wearable object such as a watch. Upon receiving information or data signals from a transducer device of a wearable object switched to a second operating mode, the monitoring system may be able to provide further information in return via personalised information signals to the transducer device emitting the first message. These data signals are ultrasonic signals, which are preferred for transmission of such signals in water so that they can be detected by a beacon of the monitoring system. This allows to detect any transducer device operating in the vicinity of the monitoring system beacon if it is necessary to be able to detect a living being such as a person wearing the watch provided with this dual-mode transducer device.

It is conceivable to use other means for generating a signal in the watch capable of fulfilling a first function in a first mode, and of being used in a second mode to perform communication by data signals with a communication device remote from the watch. In this case, it is conceivable to have a vibration generator in the watch to perform a vibration at a determined frequency in a first mode, and to use this vibration generator in a second mode to perform communication by data signals with a communication device remote from the watch.

The purpose of the present invention is indeed to be able to carry out information transmission or information reception by means of a transducer device arranged in a second mode for transmitting or receiving information from a monitoring unit of a monitoring system. Generally, information signals are first transmitted from the transducer device worn by a person operating in the water body or diving or outside the water body. These information signals may concern signalling or positioning or communication data or emergency data in the event of an emergency.

In the event that the transducer device forming part of the wearable object such as a watch is out of the water, short-range communication in the air with a monitoring unit is also possible when the transducer device of the watch is in the second selected operating mode.

For this purpose, provision is also made of a method for operating the transducer device according to the features of the claims.

Specific steps of the method for operating the transducer device are also defined in the claims.

For this purpose, provision is also made of a system for monitoring at least one transducer device of a dual-mode wearable object worn by a living being in a water body according to the features of the claims.

Particular forms of the monitoring system are defined in the claims.

BRIEF DESCRIPTION OF THE FIGURES

The purposes, advantages and features of the transducer device of a wearable object, the method for operating the transducer device and the monitoring system comprising at least one transducer device will become clearer in the following description, in a non-limiting manner, with reference to the drawings wherein.

DETAILED DESCRIPTION OF THE INVENTION

Figure 1:
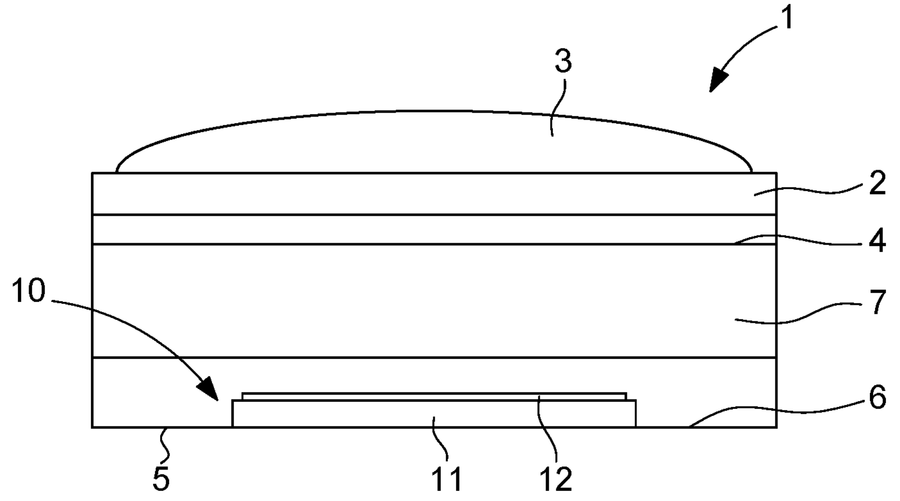
FIG. 1 shows a schematic representation of a wearable object comprising a dual-mode transducer device according to the invention.

A transducer device that is part of a wearable object, which is preferably a wristwatch, or a pocket watch, is described in the following description. However, it may also be considered that the transducer device is also the wearable object as such, with all the electronics suitable for the operations in a first operating mode and operations in a second operating mode.

In the case of a watch or timepiece, it is sought to use an alarm or an audible signalling device for a watch such as a buzzer, for example of the piezoelectric type. With this sound signalling device, which is a transducer, it is intended in this invention to reuse this transducer for a functionality other than just the alarm of the watch, by providing for use in particular in a different frequency band to enable the transfer function of the system to be optimised in the case where the watch is immersed in water, for example.

Generally speaking, it is possible to protect any transducer device of a wearable object or as a wearable object as such, likely to have a means capable of operating in dual mode. The wearable object comprises at least one means for generating a first action in a first operating mode related to a specific function of the wearable object under the control of a processor or microcontroller processing unit and being powered by a DC voltage source. The same means is arranged to generate a second communication action in a second operating mode different from the first operating mode so as to obtain a dual-mode transducer device. The second operating mode allows information or data communication signals to be communicated mainly to the outside of the transducer device of the wearable object so that it can be detected by a monitoring unit of a monitoring system, and to be able to establish communication with the monitoring system.

As the wearable object may be mainly a watch, this watch is an electronic or electromechanical watch and comprises at least one electronic circuit with a time base generally defined by a quartz oscillator. The watch also comprises an electronic circuit with at least one processor or microcontroller processing unit, and/or a set of gear wheels driven by a motor clocked by the time base for advancing the watch hands or displaying an hour on a digital dial as a first function of the watch.

Said watch may also comprise a means which may be an audible signalling device or an audible or vibration alarm signal generator designed to be programmed to generate a sound or vibration at a time defined in the first operating mode.

As explained below, the alarm signal generator is defined as a transducer device so as to be able in a first operating mode to generate an alarm at a programmed time, mainly an audible alarm, and in a second operating mode to be able to transmit or receive information signals. Generally, in the first operating mode, an audible alarm can be generated by the transducer device. This audible alarm is in a frequency band generally below 20 KHz so that it can be perceived by the human ear. On the other hand, in the second operating mode, it is possible to transmit ultrasonic signals at frequencies above 20 KHz and preferably above 100 kHz. Of course, in the second operating mode, acoustic or vibratory information signals can be sent at short distances through the air. However, the transducer device is more suitable for transmitting ultrasonic information signals when immersed in water, as ultrasonic signals are more easily detected in water than other information signals such as radio frequency signals. In addition, it has been found that the propagation of ultrasonic information signals at relatively low frequencies has low attenuation, but it is recommended to spread the information to be transmitted over a wide frequency spectrum so as to ensure underwater transfer regardless of the orientation of the wearable object such as a watch underwater.

The signals can be modulated in the second operating mode for data transmission so as to be picked up by at least one monitoring unit of a monitoring system. The signals can be modulated by frequency modulation or even phase modulation.

Such use of a monitoring system in water has been tested. Standard piezo-acoustic transducers generally work by using the lower part of the watch as a vibration radiator. The piezoelectric transducer is generally bonded to an inner surface of the back of the watch case and is operated with two electrodes orthogonal to the back of the watch case connected to a processing unit or microcontroller unit. They are preferably mounted so that their piezoelectric transducer (typically 100 μm wide) is deposited directly on a thin metal sheet.

FIG. 1 illustrates the standard structure of the wearable object 1, which in this case is a sonic watch. As the volume of the piezoelectric material is kept constant, the expansion along the thickness axis imposes a corresponding variation in the size of the planes, which forces it to bend the lower surface 6 of the back 5 of the watch 1. There are different types of mechanical construction, using either very simple geometries (piezo device) or simply bonded to the back of the watch case, or more sophisticated approaches, based on the Helmholtz cavity, which tend to increase the transfer function at air pressure, or widen the corresponding bandwidth.

In any case, a major concern is the orientation of the system, which should remain as low as possible in certain cases, such as when trying to establish communication between underwater smartwatches or trying to detect or locate them.

FIG. 1 is a simplified representation of a wearable object 1 wherein is disposed a transducer device 10 that can operate in dual mode according to the invention. Preferably, the wearable object 1 is a watch of the electronic or electromechanical wristwatch type. To simplify FIG. 1, only the case of the watch 1 is shown, wherein the various elements mentioned below are disposed, but without showing a bracelet, which allows the watch to be placed on the wrist or leg of a living being. Of course, reference will only be made to a person as a living being, as the wristwatch is preferably intended to be mounted on the wrist of a person, who can be monitored.

In the watch 1 case, a watch glass 3 may be seen on the top, which is generally transparent so as to view the time displayed on a watch dial 4 by means of time-indicating hands or also on a digital time-indicating panel. The control and action in a first operating mode is controlled by a processing unit, such as a microcontroller unit, clocked by a quartz oscillator defining a time base generally of the watch. The entire electronic or electromechanical part 7 of said watch is generally enclosed under the watch face in the generally cylindrical middle part 2 of said watch and above the back 5 of the watch case fixed in a watertight manner to the middle part 2 of the watch case.

Also shown in the watch case is a transducer device 10 mounted on an inner surface 6 of the back 5 of the watch case. This transducer device 10 may comprise in the case of an alarm signal generator in a first operating mode, an alarm comprising a piezoelectric element 11 which can be connected and controlled by an electrical connection of electrodes 12 on the top of the transducer device 10 to the microcontroller unit in the electronic circuit.

Of course, any other means forming part of the wearable object may be used. One example is a vibration generator, which can also act as an alarm signal generator by generating a vibration obtained by an electrically powered vibrator. In this case, upon a control to select the second operating mode, the transducer device or the object comprising the transducer device can transmit, in a second operating mode, vibrations in a frequency band determined according to the second operating mode. In order to be able to use the vibration-generating means, it may be possible to automatically or manually switch from the first operating mode to the second operating mode by the action of a conventional switch disposed in the watch case and operable from outside the watch case. Once the operating mode has been selected, from the first operating mode to the second operating mode or vice versa, the wearable object, preferably the watch with dual-mode transducer device, can also be programmed to switch from a second selected operating mode to a first operating mode specific to the wearable object comprising the transducer device.

Preferably, an acoustic signal generator will be used as the transducer device 10 to generate an alarm signal in a conventional watch 1 in a first operating mode. The transducer device 10 can be automatically switched to a second operating mode when the watch 1 fitted with the transducer device detects water, in particular when a person wearing the watch is diving. In the second operating mode, the transducer device 10, in conjunction with a microcontroller unit of the watch 1, is capable of transmitting ultrasonic data signals at regular intervals or of modifying these regular intervals of ultrasonic signals in a second frequency band and in such a way as to transmit in these ultrasonic signals personal data of the person wearing said transducer device, which is integrated into the wearable object such as the watch he is wearing.

In this case, the best possible orientation of the transducer device 10 integrated in the wearable object 1, such as in the watch case, can be determined in order to carry out a transmission of ultrasonic signals likely to be picked up by a beacon in a monitoring system detecting any ultrasonic data signal likely to be picked up by such a beacon in the monitoring system. The transducer device 10 may also be disposed at the dial 4, for example just below the dial 4 or partly integrated into the dial 4.

Figure 2:
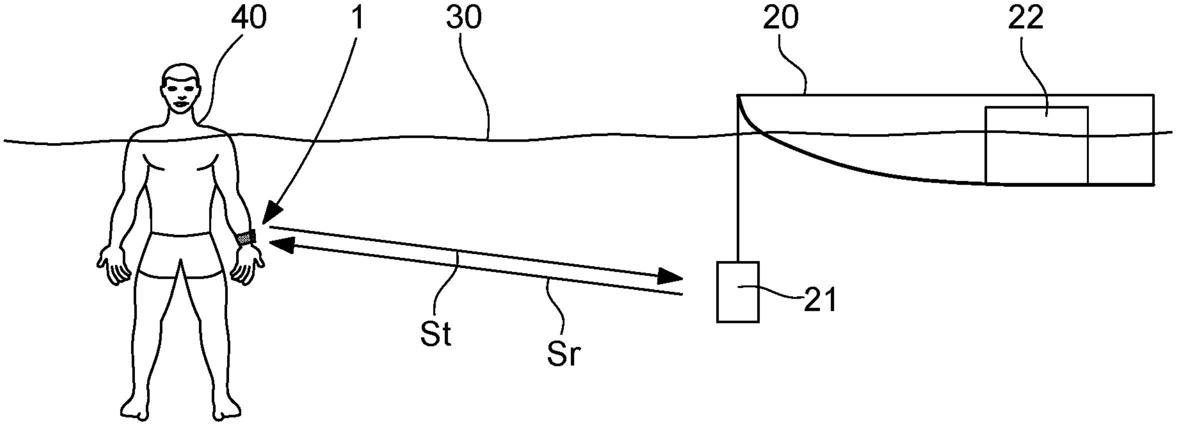
FIG. 2 shows a water body such as a lake or swimming pool with one or more people each wearing a transducer device generally disposed in a wearable object such as a watch, and capable of being manually or automatically switched upon contact with the water into the second operating mode for communication of data signals so as to be able to be detected by at least one monitoring unit of a monitoring system and establishing communication.

The monitoring system is schematically shown in FIG. 2. The monitoring system is generally designed to detect, for example, any person 40 wearing a wearable object 1 with a transducer device, who is in a water body 30. For this purpose, the monitoring system comprises at least one monitoring unit 21 in the form of a beacon or beacon buoy disposed in the water. The monitoring unit 21 can be connected to a base unit 22 of the monitoring system, which in this case is disposed in a boat 20 on the water body 30. The monitoring unit 21 can be connected to the base unit 22 by a wired connection, for example. It is of course possible to have several monitoring units 21 in the form of beacon buoys for detecting any person 40 wearing a transducer device in a wearable object 1 such as a watch, in the water body 30 and preferably for detecting at greater distances one or more divers 40 each wearing a personalised transducer device in a wearable object 1 which is advantageously a watch.

As explained above, the transducer device can switch from the first operating mode to the second operating mode automatically by detecting water in the wearable object 1 fitted with the transducer device of the wearable object, or manually by pressing a switch on the wearable object 1. Once the switching to the second operating mode has been made, the wearable object 1, which is preferably a watch, is able to transmit ultrasonic data information signals St in a second frequency band, for example in a frequency band between 150 KHz and 250 kHz. The data or information to be transmitted is modulated by frequency modulation at ±50 kHz or by phase modulation. The beacon buoy, which is the monitoring unit 21, can pick up the ultrasonic information signals St transmitted by at least one transducer device of a wearable object 1. As soon as the ultrasonic signals St are detected, the monitoring system is able to generate a response with response ultrasonic signals Sr to the transducer device of the wearable object transmitting the first ultrasonic signals St to establish communication with the personalised wearable object 1. However, the response ultrasonic signals Sr can be transmitted by the monitoring system to any transducer device of a personalised wearable object 1 in the water body 30 and in the second operating mode.

It should be noted that it is possible to monitor or detect a large number of transducer devices of any wearable object 1 worn by divers or swimmers in the water body 30 to be monitored, particularly in the second operating mode of the transducer device.

The monitoring system may comprise several monitoring units 21 connected to a base unit 22 disposed on a boat 20 floating on a water body 30. It may also be possible to have several boats 20 at a distance from each other, each with at least one monitoring unit 21. Generally, each monitoring unit can control independently of the base unit the reception of ultrasonic signals and the transmission of ultrasonic signals to at least one transducer device of a wearable object 1.

The monitoring system can also comprise wearable objects 1 with a transducer device to be detected.

It may also be considered to use a monitoring system in a swimming pool so as to monitor all the swimmers in the pool primarily. In this case, it is conceivable to place four monitoring units at the four corners of the pool so as to be connected to a base unit managing all the signals from the monitoring units.

Of course, it should also be understood that in the monitoring system, it is possible to use the second mode to receive data from other watches or devices submerged in the water body. In this case, this may involve alarms to swimmers, communications between different submerged watches or between submerged devices. Provision may also be made of communication of various parameters.

Several embodiments of the transducer device of a wearable object, such as a watch, may be designed within the scope of protection conferred by the claims.

The invention claimed is:

1. A wearable object comprising:

a dual-mode transducer configured to generate, in a first operating mode related to a specific function of the wearable object under control of a processing circuit of electronic circuitry powered by a DC voltage source, (1) acoustic signals in a first audible frequency band of 0 to 20 kHz, while in a second operating mode, different from the first operating mode, (2) ultrasonic signals in a second frequency band different from and higher than the first audible frequency band, wherein the second operating mode allows information or data communication signals to be communicated to an outside of the wearable object so that the wearable object can be detected by a monitoring circuit of a monitoring system, and receive data or parameter signals from another wearable object; and the processing circuit, which is configured to control the dual-mode transducer to switch between the first and second operating modes.

2. The wearable object according to claim 1, wherein the processing circuit is further configured to control an alarm signal generator, which is used in the first operating mode for programming an alarm within a predefined time delay or an audible signalling device.

3. The wearable object according to claim 2, wherein the alarm signal generator is further configured to cause the dual-mode transducer to generate the acoustic signals within the predefined time delay in the first operating mode, while in the second operating mode, generate the ultrasonic signals.

4. The wearable object according to claim 2, wherein the dual-mode transducer comprises a piezoelectric element, which is connected to and controlled by an electrical connection of electrodes connected to the electronic circuit circuitry.

5. The wearable object according to claim 2, wherein the alarm signal generator is further configured to generate vibration signals within the predefined time delay in the first operating mode.

6. The wearable object according to claim 3, wherein the dual-mode transducer is part of the wearable object, which is a wristwatch or a pocket watch of electronic or electromechanical type, the watch comprises a quartz oscillator defining a time base and the electronic circuitry with the processing circuit, the alarm signal generator is further configured to cause the dual-mode transducer to generate the acoustic signals within the predefined time delay in the first operating mode, and in the second operating mode, different from the first operating mode, the alarm signal generator is further configured to cause the dual-mode transducer to generate the ultrasonic signals for transmission of ultrasonic information or data signals in water so as to be detected by the monitoring circuit in a water body of the monitoring system, and establish data communication by the ultrasonic signals.

7. The wearable object according to claim 6, wherein the dual-mode transducer is further configured to automatically switch from the first operating mode to the second operating mode when the watch is underwater.

8. A method for operating the dual-mode transducer device of the wearable object according to claim 1, wherein the dual-mode transducer generates the ultrasonic signals in the second operating mode different from the first operating mode, the method comprising:

when the second operating mode is activated, performing communication of the information or data communication signals to the outside of the dual-mode transducer device of the wearable object to be detected by the monitoring circuit of the monitoring system.

9. The method according to claim 8, wherein the dual-mode transducer forms part of the wearable object, which is a wristwatch or a pocket watch of electronic or electromechanical type, the watch comprising a quartz oscillator defining a time base and the electronic circuitry with the processing circuit, and an alarm signal generator including the dual-mode transducer, which comprises a piezoelectric element that is connected to and controlled by an electrical connection of electrodes connected to the electronic circuitry, wherein the alarm signal generator generates the acoustic signals within a predefined time delay in the first operating mode, and, in the second operating mode, different from the first operating mode, the alarm signal generator generates the ultrasonic signals for transmission of ultrasonic information or data signals in water to be detected by the monitoring circuit in a water body of the monitoring system, and establish data communication by the ultrasonic signals.

10. The method according to claim 9, further comprising automatically switching from the first operating mode to the second operating mode when the watch with the dual-mode transducer enters the water of the water body.

11. A system for monitoring a living being provided with the wearable object with the dual-mode transducer according to claim 3, wherein the alarm signal generator is further configured to cause the dual-mode transducer to generate the acoustic signals within the predefined time delay in the first operating mode, while in the second operating mode, the alarm signal generator is further configured to cause the dual-mode transducer to generate the ultrasonic signals capable of being detected by the monitoring circuit in water of a water body.

12. The monitoring system according to claim 11, wherein the monitoring circuit is connected by wire to a base unit on a boat on the water body.

13. The monitoring system according to claim 11, wherein the system is configured to communicate by the ultrasonic signals in the water body via the monitoring circuit with any detected transducer of any wearable object.

* * * * *